(12) United States Patent
Kim et al.

(10) Patent No.: US 12,738,423 B2
(45) Date of Patent: Sep. 15, 2026

(54) MULTI-LAYER CERAMIC ELECTRONIC COMPONENT

(71) Applicant: SAMSUNG ELECTRO-MECHANICS CO., LTD., Suwon-si (KR)

(72) Inventors: Sungsoo Kim, Suwon-si (KR); Jaeyoung Na, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 118 days.

(21) Appl. No.: 18/634,371

(22) Filed: Apr. 12, 2024

(65) Prior Publication Data

US 2025/0125094 A1 Apr. 17, 2025

(30) Foreign Application Priority Data

Oct. 16, 2023 (KR) ........................ 10-2023-0137872

(51) Int. Cl.
*H01G 4/232* (2006.01)
*H01G 4/12* (2006.01)
*H01G 4/30* (2006.01)

(52) U.S. Cl.
CPC ............. *H01G 4/2325* (2013.01); *H01G 4/30* (2013.01); *H01G 4/1227* (2013.01)

(58) Field of Classification Search
CPC ...... H01G 4/2325; H01G 4/248; H01G 4/228; H01G 4/1227; H01G 4/232; H01G 4/30
USPC .......... 361/301.4, 306.3, 321.1, 321.3, 321.2
See application file for complete search history.

(56) References Cited

U.S. PATENT DOCUMENTS

| | | | | |
|---|---|---|---|---|
| 9,881,741 | B2 * | 1/2018 | Otani | H01G 4/2325 |
| 10,366,834 | B1 * | 7/2019 | Lee | H01G 4/012 |
| 2021/0012964 | A1 * | 1/2021 | Lee | H01G 4/232 |
| 2021/0027945 | A1 * | 1/2021 | Takahashi | H01G 4/2325 |
| 2022/0115184 | A1 | 4/2022 | Yun et al. | |
| 2022/0208457 | A1 | 6/2022 | Lee et al. | |
| 2022/0208464 | A1 | 6/2022 | Lee et al. | |

FOREIGN PATENT DOCUMENTS

| | | | |
|---|---|---|---|
| KR | 10-2022-0046893 | A | 4/2022 |
| KR | 10-2022-0096548 | A | 7/2022 |
| KR | 10-2022-0096781 | A | 7/2022 |

* cited by examiner

*Primary Examiner* — Arun Ramaswamy
(74) *Attorney, Agent, or Firm* — Morgan, Lewis & Bockius LLP

(57) ABSTRACT

A multi-layer ceramic electronic component includes: a ceramic body having a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a plurality of dielectric layers, and a first internal electrode and a second internal electrode alternately disposed in the third direction while having the dielectric layer interposed therebetween; a first external electrode connected to the first internal electrode and including a first conductive layer including a first groove in a surface and a first plating layer disposed on the first conductive layer; a first coating portion disposed in the first groove and in contact with the first plating layer.

20 Claims, 6 Drawing Sheets

MULTI-LAYER CERAMIC ELECTRONIC COMPONENT

CROSS-REFERENCE TO RELATED APPLICATION

This application claims priority to and the benefit of Korean Patent Application No. 10-2023-0137872 filed in the Korean Intellectual Property Office on Oct. 16, 2023, the entire contents of which are incorporated herein by reference.

BACKGROUND

(a) Technical Field

The present disclosure relates to a multi-layer ceramic electronic component.

(b) Description of the Related Art

In recent years, an application area of an electronic product has been expanded, thus also expanding a technology field where a multi-layer ceramic electronic component is used. In particular, a structure where the electronic control unit (ECU) or transmission control unit (TCU) of a vehicle is disposed in an engine room, is directly attached to a transmission, or the like is used in accordance with the electronicization of the vehicle.

Accordingly, the multi-layer ceramic electronic component is also required to have changed performance, and the multi-layer ceramic electronic component applied to the vehicle is required to have high reliability, high heat resistance, etc.

A method in which a moisture permeation path is blocked by coating a ceramic body may be used to improve moisture resistance reliability of the multi-layer ceramic electronic component. However, in this case, non-plating may occur later because most coating materials are insulating materials. Therefore, there is a need to develop a structure having improved moisture resistance reliability while preventing the non-plating.

SUMMARY

The present disclosure attempts to provide a multi-layer ceramic electronic component having improved moisture resistance reliability while preventing a non-plating defect of a plating layer on a coating portion.

However, problems to be solved by embodiments of the present disclosure are not limited to the above-mentioned problems and may be variously expanded in a range of the spirit of the present disclosure included in the embodiments.

According to an embodiment, a multi-layer ceramic electronic component includes: a ceramic body having a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a plurality of dielectric layers, and a first internal electrode and a second internal electrode alternately disposed in the third direction with a dielectric layer among the plurality of dielectric layers interposed therebetween; a first external electrode connected to the first internal electrode and including a first conductive layer including a first groove in a surface and a first plating layer disposed on the first conductive layer; a first coating portion disposed in the first groove and in contact with the first plating layer; a second external electrode connected to the second internal electrode and including a second conductive layer including a second groove in a surface and a second plating layer disposed on the second conductive layer; and a second coating portion disposed in the second groove and in contact with the second plating layer.

The component may include a plurality of the first grooves, a plurality of the second grooves, a plurality of the first coating portions, and a plurality of the second coating portions.

The first conductive layer may include a first connection portion disposed on the first surface of the ceramic body and connected to a portion of the first internal electrode extending from the first surface, and a first band portion extending from the first connection portion to the fifth surface and the sixth surfac of the ceramic body, and the second conductive layer includes a second connection portion disposed on the second surface of the ceramic body and connected to a portion of the second internal electrode extending from the second surface, and a second band portion extending from the second connection portion to the fifth surface and the sixth surface of the ceramic body.

The plurality of the first coating portions may include a plurality of first connection coating portions disposed on the first connection portion and a plurality of first band coating portions disposed on the first band portion, and the plurality of the second coating portions may include a plurality of second connection coating portions disposed on the second connection portion and a plurality of second band coating portions disposed on the second band portion.

A thickness of each connection coating portion among the plurality of first connection coating portions and the plurality of second connection coating portions in the first direction may be in a range of 100 nm to 300 nm.

A thickness of each band coating portion among the plurality of first band coating portions and the plurality of second band coating portions in the third direction may be in a range of 100 nm to 300 nm.

A width of each connection coating portion among the plurality of first connection coating portions and the plurality of second connection coating portions in the third direction may be in a range of 1.8 μm to 2.2 μm.

A width of each band coating portion among the plurality of first band coating portions and the plurality of second band coating portions in the first direction may be in a range of 1.8 μm to 2.2 μm.

Adjacent coating portions among the plurality of first coating portions or the plurality of the second coating portions may be arranged with a distance therebetween.

The adjacent coating portions among the plurality of the first coating portions or the plurality of the second coating portions may be arranged with a distance of 2 μm therebetween.

The component may further include a third coating portion extending from one end of the first conductive layer to one end of the second conductive layer to cover the third surface, fourth surface, fifth surface, and sixth surface of the ceramic body.

Each of the plurality of the first coating portions, the plurality of the second coating portions, and the third coating portion may include at least one of silicon dioxide ($SiO_2$), aluminum oxide ($Al_2O_3$), zirconium oxide (ZrO), zinc oxide (ZnO), and barium oxide (BaO).

The first plating layer may be disposed on the first conductive layer and the plurality of the first coating portions, and in contact with a first corner region of the third coating portion, and the second plating layer may be disposed on the second conductive layer and the plurality of the second coating portions, and in contact with a second corner region of the third coating portion.

Each of the first plating layer and the second plating layer may include an inner plating layer including nickel (Ni), and an outer plating layer disposed on the inner plating layer and including tin (Sn).

Adjacent coating portions among the plurality of the first coating portions or the plurality of the second coating portions may be spaced apart from each other.

At least one connection coating portion among the plurality of first connection coating portions and the plurality of second connection coating portions may include silicon dioxide ($SiO_2$).

A width of each connection coating portion among the plurality of first connection coating portions and the plurality of second connection coating portions in the third direction may be in a range of 1.8 μm to 2.2 μm.

At least one band coating portion among the plurality of first band coating portions and the plurality of second band coating portions may include silicon dioxide ($SiO_2$).

Adjacent connection coating portions among the plurality of first connection coating portions or the plurality of second connection coating portions may be arranged with a distance of 2 μm therebetween.

As set forth above, the multi-layer ceramic electronic component according to the embodiment may have the improved moisture resistance reliability while preventing the non-plating defect of the plating layer on the coating portion.

DETAILED DESCRIPTION

Figure 1:
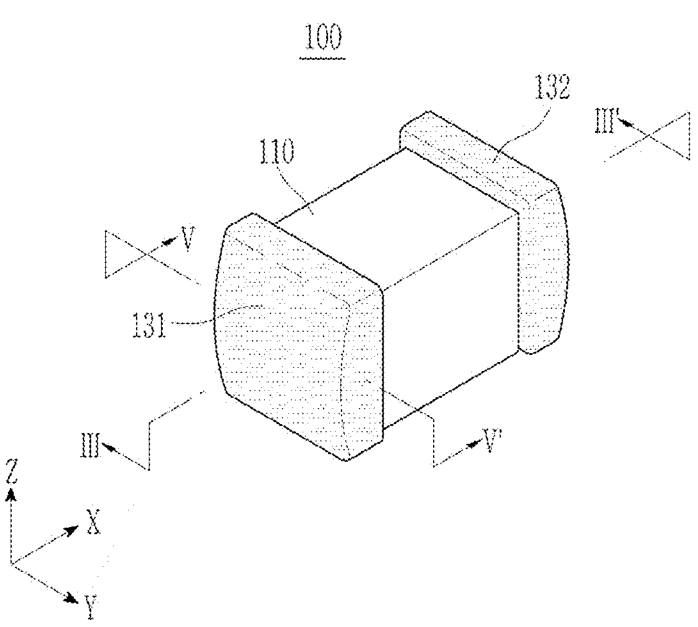
FIG. 1 is a perspective view schematically showing a multi-layer capacitor according to an embodiment of the present disclosure.

Hereinafter, embodiments of the present disclosure are described in detail with reference to the accompanying drawings for those skilled in the art to which the present disclosure pertains to easily practice the present disclosure.

A portion unrelated to the description is omitted in order to obviously describe the present disclosure, and the same or similar components are denoted by the same reference numeral throughout the specification.

In addition, some components shown in the accompanying drawings are exaggerated, omitted or schematically shown, and the size of each component does not exactly reflect its real size.

Furthermore, it is to be understood that the accompanying drawings are provided only to allow the embodiments of the present disclosure to be easily understood, and the spirit of the present disclosure is not limited by the accompanying drawings and includes all the modifications, equivalents and substitutions included in the spirit and scope of the present disclosure.

Terms including ordinal numbers such as “first,” “second” and the like, may be used to describe various components. However, these components are not limited by these terms.

The terms are used only to distinguish one component from another component.

In addition, when an element such as a layer, a film, a region or a substrate is referred to as being “on” or “above” another element, the element may be “directly on” another element or may have a third element interposed therebetween.

On the other hand, when an element is referred to as being “directly on” another element, there is no third element interposed therebetween.

In addition, when an element is referred to as being “on” or “above” a reference element, the element may be positioned on or below the reference element, and may not necessarily be “on” or “above” the reference element in an opposite direction of gravity.

It should be understood that terms “include” and “have” used in this specification specify the presence of features, numerals, steps, operations, components, parts mentioned in this specification, or combinations thereof, and do not preclude the presence or addition of one or more other features, numerals, steps, operations, components, parts, or combinations thereof.

Unless explicitly described to the contrary, “including” any component is to be understood to imply the inclusion of other components rather than the exclusion of other components.

Further, throughout the specification, an expression “on the plane” may indicate a case where a target is viewed from the top, and an expression “on the cross-section” may indicate a case where a cross-section of the target taken along a vertical direction is viewed from its side.

Throughout the specification, when an element is referred to as being “coupled to” another element, it may not only indicate that the element and another element are “directly or physically coupled to” each other, but also indicate that the element and another element are “indirectly or contactlessly coupled to” each other while having a third element interposed therebetween.

In addition, throughout the specification, when it is mentioned that any component is “connected” to another component, it may not only indicate that two or more components are directly connected with each other, but also indicate that two or more components are connected with each other indirectly through another component, may not only indicate that two or more components are physically connected with each other, but also indicate that two or more components are electrically connected to each other, or two or more components are a single entity although referred to by different names based on their dispositions or functions.

In the drawings, an X-axis direction refers to a first direction, an L direction, or a length direction, a Y-axis direction refers to a second direction, a W direction, or a width direction, and a Z-axis direction refers to a third direction, a T direction, or a thickness direction.

Figure 2:
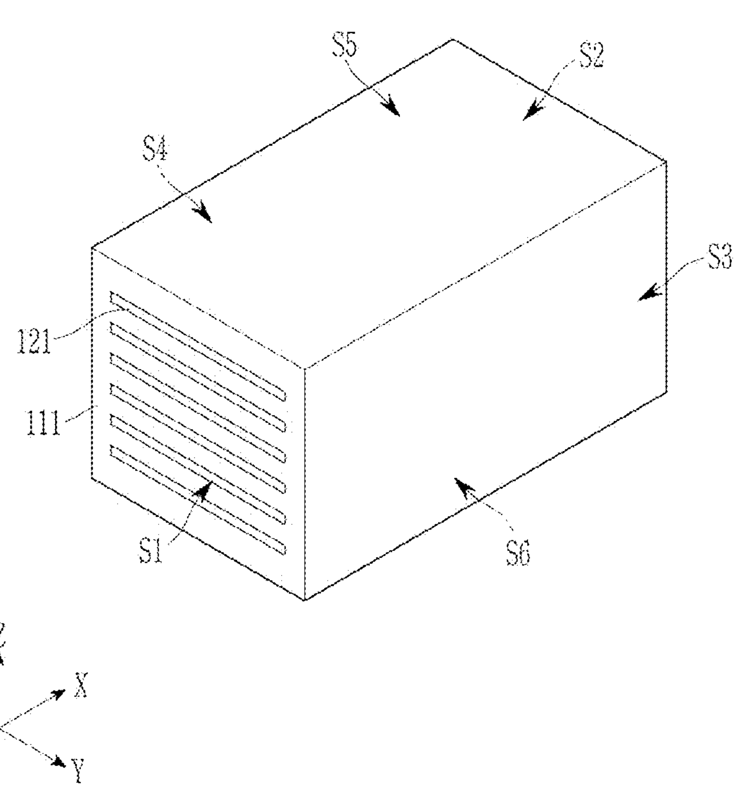
FIG. 2 is a perspective view schematically showing a ceramic body of FIG. 1.

FIG. 1 is a perspective view schematically showing a multi-layer capacitor according to an embodiment of the present disclosure; FIG. 2 is a perspective view schematically showing a ceramic body of FIG. 1; and FIG. 3 is a cross-sectional view taken along line III-III' of FIG. 1.

Figure 3:
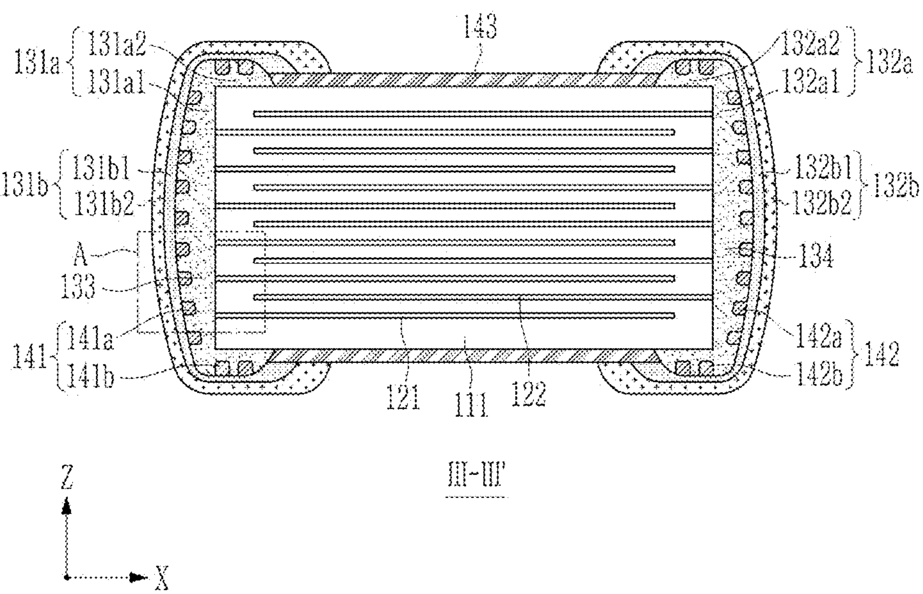
FIG. 3 is a cross-sectional view taken along line III-III' of FIG. 1.

Referring to FIGS. 1 to 3, a multi-layer ceramic electronic component 100 according to one embodiment may include: a ceramic body 110 having a first surface S1 and a second surface S2 opposing each other in a first direction (or an X-axis direction), a third surface S3 and a fourth surface S4 opposing each other in a second direction (or a Y-axis direction) perpendicular to the first direction (or the X-axis direction), and a fifth surface S5 and a sixth surface S6 opposing each other in a third direction (or a Z-axis direction) perpendicular to the first direction (or the X-axis direction) and the second direction (or the Y-axis direction), and including a plurality of dielectric layers 111, and a first internal electrode 121 and a second internal electrode 122 alternately disposed in the third direction (or the Z-axis direction) while having the dielectric layer 111 interposed therebetween; a first external electrode 131 connected to the first internal electrode 121 and including a first conductive layer 131*a* and a first plating layer 131*b* disposed on the first conductive layer 131*a*; a first coating portion 141 disposed in a first groove 133 disposed in the first conductive layer 131*a* and in contact with the first plating layer 131*b*; a second external electrode 132 connected to the second internal electrode 122 and including a second conductive layer 132*a* and a second plating layer 132*b* disposed on the second conductive layer 132*a*; and a second coating portion 142 disposed in a second groove 134 disposed in the second conductive layer 132*a* and in contact with the second plating layer 132*b*. In addition, the plurality of first grooves 133 and the plurality of second grooves 134 may be provided, and the plurality of first coating portions 141 and the plurality of second coating portions 142 may be provided.

The multi-layer ceramic electronic component 100 according to an embodiment may include the ceramic body 110 including the dielectric layer 111 and the first and second internal electrodes 121 and 122 alternately stacked in the third direction (or the Z-axis direction) while having the dielectric layer 111 interposed therebetween.

The ceramic body 110 may have the first and second surfaces S1 and S2 opposing each other in the first direction (or the X-axis direction), the third and fourth surfaces S3 and S4 opposing each other in the second direction (or the Y-axis direction), and the fifth and sixth surfaces S5 and S6 opposing each other in the third direction (or the Z-axis direction).

The ceramic body 110 is not limited to a particular shape, and may have a hexahedral shape or a shape similar to the hexahedral shape, as shown in the drawings. The ceramic body 110 may not have the hexahedral shape having perfectly straight lines because a ceramic powder included in the ceramic body 110 is contracted in a process in which the ceramic body is sintered. However, the ceramic body 110 may have a substantially hexahedral shape. The ceramic body 110 may have a corner round-processed not to be sharp if necessary. Round processing may be performed using, for example, barrel polishing, or the like, and is not limited thereto.

The ceramic body 110 may be formed by alternately stacking the dielectric layer 111, the first internal electrode 121, and the second internal electrode 122. The dielectric layer 111, the first internal electrode 121, and the second internal electrode 122 may be stacked in the third direction (or the Z-axis direction). The plurality of dielectric layers 111 may already be sintered, and the adjacent dielectric layers 111 may thus be integrated with each other, thus making it difficult to confirm a boundary therebetween without using a scanning electron microscope (SEM).

The dielectric layer 111 may include a ceramic material having a high dielectric constant, such as barium titanate ($BaTiO_3$)-based ceramic powders, strontium titanate ($SrTiO_3$)-based ceramic powders, or the like. However, a material of the dielectric layer 111 of the present disclosure is not limited thereto as long as sufficient capacitance may be acquired.

The dielectric layer 111 may be formed by adding necessary additives to a slurry including the above-mentioned materials, coating the same on a carrier film, and drying the same to prepare a plurality of ceramic sheets. The ceramic sheet may be formed by manufacturing the slurry into a sheet having a thickness of several μm by using a doctor blade method, and is not limited thereto.

The ceramic body 110 may be formed by alternately stacking a ceramic green sheet having the first internal electrode 121 printed on the dielectric layer 111 and a ceramic green sheet having the second internal electrode 122 printed on the dielectric layer 111 in the third direction (Z-axis direction). A printing method of the first and second internal electrodes 121 and 122 may be a screen printing method or a gravure printing method, and is not limited thereto.

The first and second internal electrodes 121 and 122 may be stacked for the respective cross-sections to be exposed to both opposing ends of the ceramic body 110. In detail, the first and second internal electrodes 121 and 122 may respectively be exposed to both surfaces of the ceramic body 110 in the first direction (or the X-axis direction), the first internal electrode 121 may be exposed to the first surface S1 of the ceramic body 110, and the second internal electrode 122 may be exposed to the second surface S2.

The first and/or second internal electrode 121 and/or 122 may include a conductive metal. For example, the conductive metal may include at least one of nickel (Ni), copper (Cu), tin (Sn), palladium (Pd), platinum (Pt), iron (Fe), gold (Au), silver (Ag), tungsten (W), titanium (Ti), lead (Pb), or an alloy thereof. The first and/or second internal electrode 121 and/or 122 may be formed using a conductive paste including the conductive metal.

In the multi-layer ceramic electronic component 100 according to an embodiment, the first external electrode 131 and the second external electrode 132 may be disposed on the outer surfaces of the ceramic body 110. The first external electrode 131 may be disposed on the first surface S1 of the ceramic body 110, and the second external electrode 132 may be disposed on the second surface S2 of the ceramic body 110.

Voltages having different polarities may respectively be provided to the first and second external electrodes 131 and 132, and the first and second external electrodes 131 and 132 may respectively be electrically connected to exposed portions of the first and second internal electrodes 121 and 122.

The first external electrode 131 may include the first conductive layer 131*a* disposed on the surface of the ceramic body 110 and connected to the first internal electrode 121, and the first plating layer 131*b* disposed on the first conductive layer 131*a*. The first plating layer 131*b* may include a first inner plating layer 131*b*1 covering the first conductive layer 131*a*, and a first outer plating layer 131*b*2 disposed on the first inner plating layer 131*b*1. In addition, the second external electrode 132 may include the second conductive layer 132*a* disposed on the surface of the ceramic body 110 and connected to the second internal electrode 122, and the second plating layer 132*b* disposed on the second conductive layer 132*a*. The second plating layer 132*b* may include a second inner plating layer 132*b*1 covering the second conductive layer 132*a*, and a second outer plating layer 132*b*2 disposed on the second inner plating layer 132*b*1.

The first conductive layer 131*a* and the second conductive layer 132*a* may be fired electrodes each including the conductive metal. For example, the conductive metal may include at least one of nickel (Ni), copper (Cu), tin (Sn), palladium (Pd), platinum (Pt), iron (Fe), gold (Au), silver (Ag), tungsten (W), titanium (Ti), lead (Pb), or an alloy thereof, and further include glass and epoxy in addition thereto.

As an example of a method of forming the first conductive layer 131*a* and/or the second conductive layer 132*a*, the conductive layer may be formed by dipping the ceramic body into the conductive paste including the conductive metal and then firing the same, or may be formed by printing the conductive paste on the surface of the ceramic body by the screen printing method or the gravure printing method and then firing the same. In addition, the conductive layer may be formed using a method of coating the conductive paste on the surface of the ceramic body or transferring a dried film formed by drying the conductive paste to the ceramic body, and then firing the same, or the like. However, the present disclosure is not limited thereto, and the conductive layer may be formed by forming the conductive paste on the ceramic body and then firing the same by using various methods in addition to the above-mentioned methods.

The first conductive layer 131*a* may include a first connection portion 131*a*1 and a first band portion 131*a*2.

The first connection portion 131*a*1 may be a part disposed on the first surface S1 of the ceramic body 110, and connected to the exposed portion of the first internal electrode 121. In detail, the first connection portion 131*a*1 may be connected to the first internal electrode 121 exposed from the third surface S3 of the ceramic body 110.

The first band portion 131*a*2 may be a part extending from the first connection portion 131*a*1 partially to the other surface of the ceramic body 110. For example, the first band portion 131*a*2 may extend partially to the third, fourth, fifth, and sixth surfaces S3, S4, S5, and S6 of the ceramic body 110 to improve its adhesion strength or the like.

The second conductive layer 132*a* may include a second connection portion 132*a*1 and a second band portion 132*a*2.

The second connection portion 132*a*1 may be disposed on the second surface S2 of the ceramic body 110 and connected to the exposed portion of the second internal electrode 122. In detail, the second connection portion 132*a*1 may be connected to the second internal electrode 122 exposed from the second surface S2 of the ceramic body 110.

The second band portion 132*a*2 may be a part extending from the second connection portion 132*a*1 partially to the other surface of the ceramic body 110. For example, the second band portion 132*a*2 may extend partially to the third, fourth, fifth, and sixth surfaces S3, S4, S5, and S6 of the ceramic body 110 to improve its adhesion strength or the like.

The plurality of first coating portions 141 may be disposed on the first conductive layer 131*a*, and the plurality of second coating portions 142 may be disposed on the second conductive layer 132*a*. In addition, a third coating portion 143 may partially cover the ceramic body 110. In detail, the third coating portion 143 of the present disclosure may entirely cover the exposed surface of the ceramic body 110. In this way, it is possible to block moisture from penetrating between the first and/or second conductive layer 131*a* and/or 132*a* and the ceramic body 110, and acquire excellent moisture resistance reliability.

Each of the plurality of first coating portions 141, the plurality of second coating portions 142, and the third coating portions 143 may include an insulating material or a material for preventing moisture penetration. For example, each of the plurality of the first coating portions 141, the plurality of second coating portions 142, and the third coating portions 143 may include silicon dioxide ($SiO_2$), aluminum oxide ($Al_2O_3$), zirconium oxide (ZrO), zinc oxide (ZnO), or barium oxide (BaO). Each of the plurality of the first coating portions 141, the plurality of second coating portions 142, and the third coating portions 143 may be an inorganic thin film layer. The inorganic thin film layer may be made of the oxide, nitride, or compound of a metal and/or that of a non-metal compound. In this embodiment, when each of the plurality of first coating portions 141, the plurality of second coating portions 142, and the third coating portions 143 is the inorganic thin film layer, its chemical reaction with an external contaminant may be minimized, thus improving reliability of the multi-layer ceramic electronic component 100. A component of the inorganic thin film layer is not particularly limited. However, the component of the inorganic thin film layer may include, for example, at least one oxide selected from the group consisting of aluminum oxide ($Al_2O_3$), hafnium oxide ($HfO_2$), zirconium dioxide ($ZrO_2$), lanthanum oxide ($La_2O_3$), silicon dioxide ($SiO_2$), tantalum oxide ($Ta_2O_5$), niobium oxide ($Nb_2O_5$), yttrium (II) oxide ($Y_2O_3$), strontium titanate ($SrTiO_3$), barium titanate ($BaTiO_3$) or at least one nitride selected from the group consisting of aluminum nitride (AlN) and silicon nitride ($SiN_x$).

A method of forming the plurality of first coating portions 141, the plurality of second coating portions 142, and the third coating portions 143 of the multi-layer ceramic electronic component is not particularly limited. For example, the coating portion may be formed by an atomic layer deposition (ALD) method, a molecular layer deposition (MLD) method, a chemical vapor deposition (CVD) method, a sputtering method, or the like, and is not limited to thereto.

The first and/or second inner plating layer 131*b*1 and/or 132*b*1 and/or the first and/or second outer plating layer 131*b*2 and/or 132*b*2 may include at least one selected from the group consisting of copper (Cu), tin (Sn), nickel (Ni), palladium (Pd), platinum (Pt), gold (Au), silver (Ag), tungsten (W), titanium (Ti), lead (Pb), or an alloy thereof, and is not limited thereto. For example, the first and/or second inner plating layer 131*b*1 and/or 132*b*1 may include nickel (Ni), and the first and/or second outer plating layer 131*b*2 and/or 132*b*2 may include tin (Sn).

As described above, the first and/or second external electrode 131 and/or 132 may have a structure where two or more plating layers including different components are stacked, and is not limited thereto. When having a structure where two or more plating layers are stacked as described above, the multi-layer ceramic electronic component 100 of this embodiment may simultaneously satisfy a desired mechanical property together with the excellent moisture resistance reliability. The plating layer may be formed by the sputtering method or an electrolytic plating (or electric deposition) method, and is not limited thereto.

Hereinafter, the description describes the first and second conductive layers 131*a* and 132*a*, the plurality of first coating portions 141, the plurality of second coating portions 142, and the third coating portions 143 with reference to FIGS. 4 and 5 together with FIG. 3.

Figure 4:
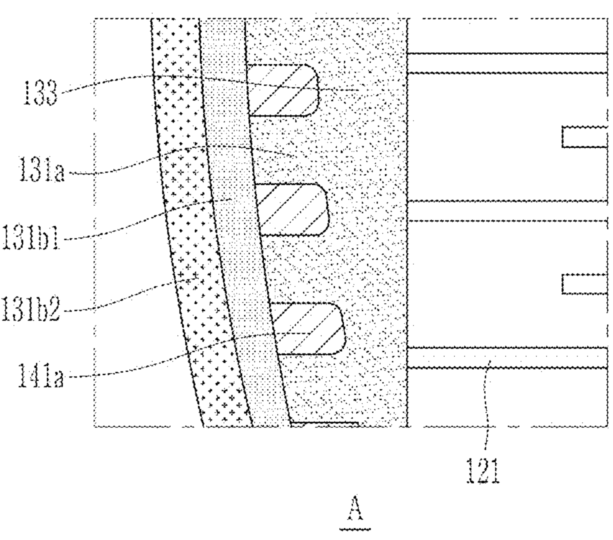
FIG. 4 is an enlarged cross-sectional view of region A of FIG. 3.
Figure 5:
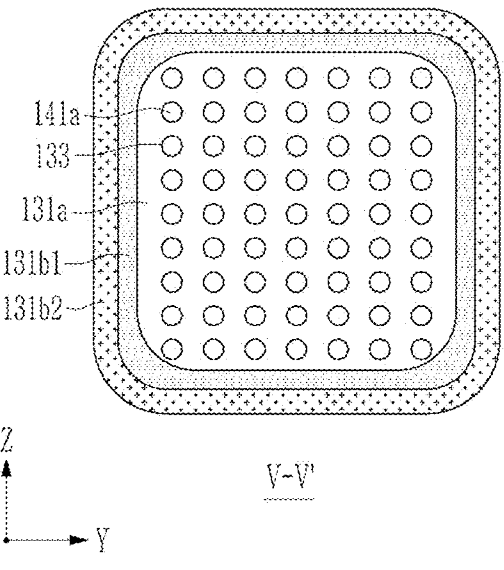
FIG. 5 is a cross-sectional view taken along line V-V' of FIG. 1.

FIG. 4 is an enlarged cross-sectional view of region A of FIG. 3; and FIG. 5 is a cross-sectional view taken along line V-V' of FIG. 1. FIGS. 4 and 5 show the first external electrode 131, and the same configuration may be applied to the second external electrode 132.

The plurality of first grooves 133 may be disposed in a surface of the first conductive layer 131*a*. Each of the plurality of first coating portions 141 may be disposed in each of the plurality of first grooves 133. In other words, the plurality of first coating portions 141 may be disposed in the plurality of first grooves 133. In addition, the plurality of second grooves 134 may be disposed in a surface of the second conductive layer 132*a*. Each of the plurality of second coating portions 142 may be disposed in each of the plurality of second grooves 134. In other words, the plurality of second coating portions 142 may be disposed in the plurality of second grooves 134.

In a manufacturing process of the multi-layer ceramic electronic component 100, the plurality of first coating portions 141 and the plurality of second coating portions 142 may respective be formed between the plurality of first grooves 133 formed on the surface of the first conductive layer 131*a* and the plurality of second grooves 134 formed on the surface of the second conductive layer 132*a*. In other words, the plurality of first coating portions 141 and the plurality of second coating portions 142 may respectively fill irregularities formed in the surfaces of the first and second conductive layers 131*a* and 132*a*.

The plurality of first coating portions 141 may respectively be spaced apart from each other. The plurality of second coating portions 142 may respectively be spaced apart from each other. That is, adjacent coating portions among the plurality of first coating portions 141 and/or the plurality of second coating portions 142 may respectively be spaced apart from each other. The plurality of first coating portions 141 and/or the plurality of second coating portions 142 may be arranged while having a certain distance therebetween. For example, the plurality of first coating portions 141 and/or the plurality of second coating portions 142 may be respectively arranged while having a distance of 2 μm. This distance may be the shortest distance from a surface of the coating portion to the nearest surface on the adjacent coating portion. The distance may be measured by, for example, SEM. Other methods and/or tools appreciated by one of ordinary skill in the art, even if not described in the present disclosure, may also be used.

Each of the plurality of first coating portions 141 and/or the plurality of second coating portions 142 may have a circular cross-sectional shape, are not limited thereto, and may have any shape formed by being accommodated in the first groove 133 and/or the second groove 134, such as a polygonal shape.

The plurality of first coating portions 141 may include a plurality of first connection coating portions 141*a* disposed on the first connection portion 131*a*1 and a plurality of first band coating portions 141*b* disposed on the first band portion 131*a*2. In addition, the plurality of second coating portions 142 may include a plurality of second connection coating portions 142*a* disposed on the second connection portion 132*a*1 and a plurality of second band coating portions 142*b* disposed on the second band portion 132*a*2.

A thickness of each connection coating portion among the plurality of first connection coating portions 141*a* and the plurality of second connection coating portions 142*a* in the first direction (or the X-axis direction) may be in a range of 100 nm to 300 nm. In addition, each thickness of the plurality of first band coating portions 141*b* and the plurality of second band coating portions 142*b* in the third direction (or the Z-axis direction) may be in the range of 100 nm to 300 nm.

In this specification, the thickness of each coating portion among the first and/or second coating portion 141 and/or 142 may refer to a thickness measured in a direction perpendicular to the surface of the conductive layer 131*a* and/or 132*a*. In detail, the thickness of each connection coating portion among the plurality of first connection coating portions 141*a* and/or the plurality of second connection coating portions 142*a* may be the maximum value or the minimum value among lengths of a plurality of line segments connected from one end to the other end of each of the plurality of first and/or second connection coating portions 141*a* and/or 142*a* in the first direction (or the X-axis direction), or the arithmetic average value of the lengths of the plurality of line segments described above, based on an X-Z cross section passing through the center of the multi-layer ceramic electronic component 100 in the second direction (or the Y-axis direction). The arithmetic average value may refer to the arithmetic average of their thicknesses measured at points where a region where the corresponding member is disposed is divided into ten equal distances on the above-mentioned X-Z cross section.

In addition, a thickness of each band coating portion among the plurality of first band coating portions 141*b* and/or the plurality of second band coating portions 142*b* may be the maximum value or the minimum value among lengths of a plurality of line segments connected from one end to the other end of each of the plurality of first and/or second band coating portions 141*b* and/or 142*b* in the third direction (or the Z-axis direction), or the arithmetic average value of the lengths of the plurality of line segments described above, based on the X-Z cross section passing through the center of the multi-layer ceramic electronic component 100 in the second direction (or the Y-axis direction). The arithmetic average value may refer to the arithmetic average of their thicknesses measured at points where a region where the corresponding member is disposed is divided into ten equal distances on the above-mentioned X-Z cross section.

The thicknesses of the connection coating portion and the band coating portion may be measured by, for example, SEM. Other methods and/or tools appreciated by one of ordinary skill in the art, even if not described in the present disclosure, may also be used.

In Table 1 below, whether a non-plating defect occurs is confirmed by observing a cross-section of the multi-layer ceramic electronic component through the SEM. A moisture resistance reliability test measures the number of defects occurring when a rated voltage is applied for 24 hours at a temperature of 85° C. and relative humidity of 85%.

TABLE 1

| NO. | Evaluation item | Coated thickness (avg.) | Non-plating defect | Moisture resistance reliability defect |
|---|---|---|---|---|
| 1 | Not coated | 0 | 0/10 | 50/200 |
| 2 | Coated with $SiO_2$ | 30 nm | 0/10 | 48/200 |
| 3 | Coated with $SiO_2$ | 50 nm | 0/10 | 12/200 |
| 4 | Coated with $SiO_2$ | 100 nm | 0/10 | 6/200 |
| 5 | Coated with $SiO_2$ | 200 nm | 0/10 | 5/200 |
| 6 | Coated with | 300 nm | 0/30 | 6/200 |

TABLE 1-continued

| NO. | Evaluation item | Coated thickness (avg.) | Non-plating defect | Moisture resistance reliability defect |
|---|---|---|---|---|
| | $SiO_2$ | | | |
| 7 | Coated with $SiO_2$ | 400 nm | 10/30 | 4/200 |
| 8 | Coated with $SiO_2$ | 600 nm | 28/30 | 5/200 |
| 9 | Coated with $SiO_2$ | 700 nm | 27/30 | 6/200 |
| 10 | Coated with $SiO_2$ | 800 nm | 28/30 | 2/200 |

Referring to Table 1 above, it may be confirmed that the multi-layer ceramic electronic component has reduced moisture resistance reliability when each thickness of the plurality of first connection coating portions 141*a* and the plurality of second connection coating portions 142*a* is less than 100 nm, and the non-plating occurs when the thickness is 300 nm or more. In comparison, it may be confirmed that the multi-layer ceramic electronic component has improved moisture resistance reliability while preventing the non-plating of the plating layer when each thickness of the plurality of first connection coating portions 141*a* and the plurality of second connection coating portions 142*a* is within the range of 100 nm to 300 nm. The width of each connection coating portion among the plurality of first connection coating portions 141*a* and the plurality of second connection coating portions 142*a* in the third direction (or the Z-axis direction) may be in a range of 1.8 μm to 2.2 μm. In addition, the width of each band coating portion among the plurality of first band coating portions 141*b* and the plurality of second band coating portions 142*b* in the first direction (or the X-axis direction) may be in the range of 1.8 μm to 2.2 μm. For example, the width of each connection coating portion among the plurality of first connection coating portions 141*a* and the plurality of second connection coating portions 142*a* in the third direction (the Z-axis direction) may be 2 μm. In addition, the width of each band coating portion among the plurality of first band coating portions 141*b* and the plurality of second band coating portions 142*b* in the first direction (or the X-axis direction) may be 2 μm. The multi-layer ceramic electronic component may have poor moisture resistance reliability when each width of the plurality of first connection coating portions 141*a* and the plurality of second connection coating portions 142*a* in the third direction (or the Z-axis direction) is less than 1.8 μm, and may have the non-plating of the plating layer when the width is more than 2.2 μm. In addition, the multi-layer ceramic electronic component may have the poor moisture resistance reliability when each width of the plurality of first band coating portions 141*b* and the plurality of second band coating portions 142*b* in the first direction (or the X-axis direction) is less than 1.8 μm, and may have the non-plating of the plating layer when the width is more than 2.2 μm.

In this specification, a "width" of the first and/or second coating portion 141 and/or 142 may refer to its width measured in a direction perpendicular to both opposing surfaces of the first and/or second coating portion 141 and/or 142. In detail, the width of each connection coating portion among the plurality of first connection coating portions 141*a* and/or the plurality of second connection coating portions 142*a* may be the maximum value or the minimum value among the lengths of the plurality of line segments connected from one end to the other end of each of the plurality of first and/or second connection coating portions 141*a* and/or 142*a* in the third direction (or the Z-axis direction), or the arithmetic average value of the lengths of the plurality of line segments described above, based on the X-Z cross section passing through the center of the multi-layer ceramic electronic component 100 in the second direction (or the Y-axis direction). The arithmetic average value may refer to the arithmetic average of their widths measured at the points where the region where the corresponding member is disposed is divided into the ten equal distances on the above-mentioned X-Z cross section.

In addition, the width of each band coating portion among the plurality of first band coating portions 141*b* and/or the plurality of second band coating portions 142*b* may be the maximum value or the minimum value among lengths of a plurality of line segments connected from one end to the other end of each of the plurality of first and/or second band coating portions 141*b* and/or 142*b* in the first direction (or the X-axis direction), or the arithmetic average value of the lengths of the plurality of line segments described above, based the X-Z cross section passing through the center of the multi-layer ceramic electronic component 100 in the second direction (or the Y-axis direction). The arithmetic average value may refer to the arithmetic average of their widths measured at the points where the region where the corresponding member is disposed is divided into the ten equal distances on the above-mentioned X-Z cross section.

The widths of the connection coating portion and the band coating portion may be measured by, for example, SEM. Other methods and/or tools appreciated by one of ordinary skill in the art, even if not described in the present disclosure, may also be used.

In the manufacturing process of the multi-layer ceramic electronic component 100, the first conductive layer 131*a* and the second conductive layer 132*a* may be formed on the ceramic body 110, and the plurality of first coating portions 141, the plurality of second coating portions 142, and the third coating portions 143 may then be formed. Accordingly, the third coating portion 143 may be in contact with one corner region of the first conductive layer 131*a* and/or that of the second conductive layer 132*a*. In detail, the third coating portion 143 may extend from one end of the first conductive layer 131*a* to one end of the second conductive layer 132*a* to cover the third surface S3, fourth surface S4, fifth surface S5, and sixth surface S6 of the ceramic body 110.

In addition, in the manufacturing process of the multi-layer ceramic electronic component 100, the third coating portion 143 may be formed, and the plating layers 131*b* and 132*b* may then be formed. Accordingly, the first inner plating layer may be in contact with one corner region of the third coating portion 143, and the second inner plating layer 132*b*1 may be in contact with the other corner region of the third coating portion 143. The first inner plating layer 131*b*1 may be disposed on the first conductive layer 131*a* and/or the plurality of first coating portions 141, and the second inner plating layer 132*b*1 may be disposed on the second conductive layer 132*a* and the plurality of second coating portions 142.

Figure 6:
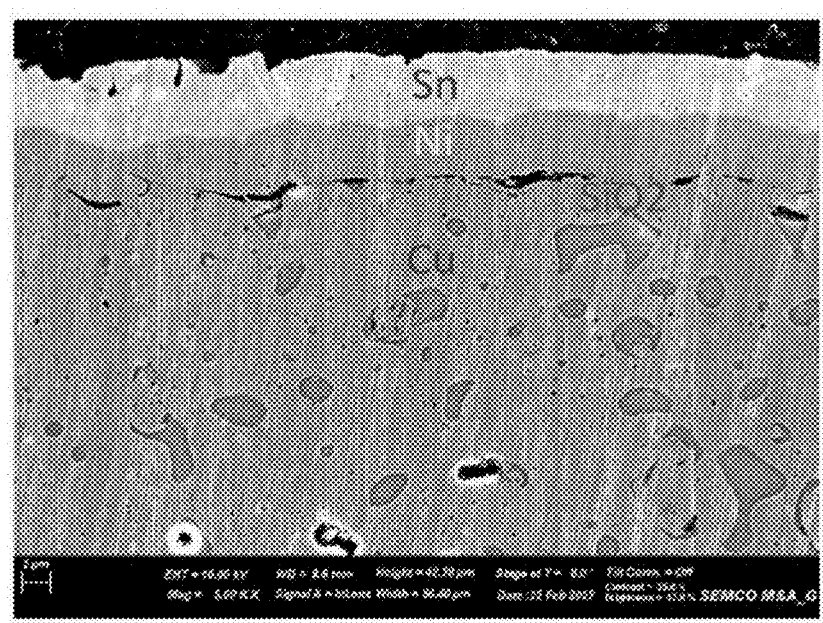
FIG. 6 is a scanning electron microscope (SEM) image of a cross-section of a multi-layer ceramic electronic component according to an embodiment.

FIG. 6 is the scanning electron microscope (SEM) image of the cross-section of the multi-layer ceramic electronic component according to an embodiment.

Referring to FIG. 6, it may be confirmed the structure where the plurality of coating portions are disposed in the plurality of grooves disposed in the surface of the conductive layer including copper (Cu), the inner plating layer including nickel (Ni) is disposed on the conductive layer and/or the plurality of coating portions, and the outer plating layer including tin (Sn) is disposed on the inner plating layer.

As described above, the multi-layer ceramic electronic component 100 according to an embodiment may include the plurality of first coating portions 141 and the plurality of second coating portions 142 respectively disposed in the plurality of first grooves 133 and the plurality of second grooves 134, thus improving the moisture resistance reliability of the multi-layer ceramic electronic component while preventing the non-plating defect of the plating layer on the coating portion.

Although the embodiments of the present disclosure have been described, it is to be understood that the present disclosure is not limited to the disclosed embodiments. Various modifications may be made within the scopes of the claims, the description of the present disclosure and the accompanying drawings, which also fall within the scope of the present disclosure.

What is claimed is:

1. A multi-layer ceramic electronic component comprising:

a ceramic body having a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, the ceramic body including a plurality of dielectric layers, and a first internal electrode and a second internal electrode alternately disposed in the third direction with a dielectric layer among the plurality of dielectric layers interposed therebetween;

a first external electrode connected to the first internal electrode, the first external electrode including;

a first conductive layer including a first groove in a surface of the first conductive layer, and a first plating layer disposed on the first conductive layer;

a first coating portion in contact with the first plating layer, the first coating portion including a plurality of rows of first coating portions, each row among the plurality of rows of first coating portions including a plurality of first coating portions, and a coating portion among the plurality of first coating portions being disposed in the first groove;

a second external electrode connected to the second internal electrode, the second external electrode including:

a second conductive layer including a second groove in a surface of the second conductive layer, and a second plating layer disposed on the second conductive layer; and a second coating portion disposed in the second groove and in contact with the second plating layer.

2. The component of claim 1, wherein the first groove comprises a plurality of first grooves, the second groove comprises a plurality of second grooves, and the second coating portion comprises a plurality of second coating portions.

3. The component of claim 2, wherein the first conductive layer includes a first connection portion disposed on the first surface of the ceramic body and connected to a portion of the first internal electrode extending from the first surface, and a first band portion extending from the first connection portion to the fifth surface and the sixth surface of the ceramic body, and the second conductive layer includes a second connection portion disposed on the second surface of the ceramic body and connected to a portion of the second internal electrode extending from the second surface, and a second band portion extending from the second connection portion to the fifth surface and the sixth surface of the ceramic body.

4. The component of claim 3, wherein the plurality of the first coating portions include a plurality of first connection coating portions disposed on the first connection portion and a plurality of first band coating portions disposed on the first band portion, and the plurality of the second coating portions include a plurality of second connection coating portions disposed on the second connection portion and a plurality of second band coating portions disposed on the second band portion.

5. The component of claim 4, wherein a thickness of each connection coating portion among the plurality of first connection coating portions and the plurality of second connection coating portions in the first direction is in a range of 100 nm to 300 nm.

6. The component of claim 4, wherein a thickness of each band coating portion among the plurality of first band coating portions and the plurality of second band coating portions in the third direction is in a range of 100 nm to 300 nm.

7. The component of claim 4, wherein a width of each connection coating portion among the plurality of first connection coating portions and the plurality of second connection coating portions in the third direction is in a range of 1.8 μm to 2.2 μm.

8. The component of claim 4, wherein a width of each band coating portion among the plurality of first band coating portions and the plurality of second band coating portions in the first direction is in a range of 1.8 μm to 2.2 μm.

9. The component of claim 2, wherein adjacent coating portions among the plurality of the first coating portions or the plurality of the second coating portions are arranged with a distance therebetween.

10. The component of claim 9, wherein the adjacent coating portions among the plurality of the first coating portions or the plurality of the second coating portions are arranged with a distance of 2 μm therebetween.

11. The component of claim 2, further comprising a third coating portion extending from one end of the first conductive layer to one end of the second conductive layer to cover the third surface, fourth surface, fifth surface, and sixth surface of the ceramic body.

12. The component of claim 11, wherein each coating portion among the plurality of the first coating portions, the plurality of the second coating portions, and the third coating portion includes at least one selected from the group consisting of silicon dioxide ($SiO_2$), aluminum oxide ($Al_2O_3$), zirconium oxide (ZrO), zinc oxide (ZnO), and barium oxide (BaO).

13. The component of claim 11, wherein the first plating layer is disposed on the first conductive layer and the plurality of the first coating portions, and in contact with a first corner region of the third coating portion, and the second plating layer is disposed on the second conductive layer and the plurality of the second coating portions, and in contact with a second corner region of the third coating portion.

14. The component of claim 13, wherein each of the first plating layer and the second plating layer includes an inner plating layer including nickel (Ni), and an outer plating layer disposed on the inner plating layer and including tin (Sn).

15. The component of claim 2, wherein adjacent coating portions among the plurality of the first coating portions or the plurality of the second coating portions are spaced apart from each other.

16. The component of claim 5, wherein at least one connection coating portion among the plurality of first connection coating portions and the plurality of second connection coating portions includes silicon dioxide ($SiO_2$).

17. The component of claim 16, wherein a width of each connection coating portion among the plurality of first connection coating portions and the plurality of second connection coating portions in the third direction is in a range of 1.8 μm to 2.2 μm.

18. The component of claim 17, wherein at least one band coating portion among the plurality of first band coating portions and the plurality of second band coating portions includes silicon dioxide ($SiO_2$).

19. The component of claim 18, wherein adjacent connection coating portions among the plurality of first connection coating portions or the plurality of second connection coating portions are arranged with a distance of 2 μm therebetween.

20. The component of claim 4, further comprising a third coating portion extending from one end of the first conductive layer to one end of the second conductive layer to cover the third surface, fourth surface, fifth surface, and sixth surface of the ceramic body, wherein the plurality of first band coating portions are spaced apart from the third coating portion, the first conductive layer is the innermost layer of the first external electrode, each coating portion among the plurality of the first coating portions includes at least one selected from the group consisting of zinc oxide (ZnO) and barium oxide (BaO), each coating portion among the plurality of first connection coating portions is disposed in each groove among the plurality of first grooves in a one-to-one correspondence, each coating portion among the plurality of first coating portions is circular or polygonal, and a thickness of each connection coating portion among the plurality of first connection coating portions in the third direction is in a range of 200 nm to 300 nm.

* * * * *